United States Patent [19]

McVeen

[11] 4,126,208
[45] Nov. 21, 1978

[54] ADJUSTABLE LOCK FOR MAST HANGER
[75] Inventor: Milford D. McVeen, Highland Heights, Ohio
[73] Assignee: Towmotor Corporation, Mentor, Ohio
[21] Appl. No.: 823,903
[22] Filed: Aug. 12, 1977
[51] Int. Cl.² .............................................. B66F 9/20
[52] U.S. Cl. .................................. 187/1 R; 187/9 R; 214/674; 403/154; 403/315
[58] Field of Search ............... 187/1 R, 9 R; 214/670, 214/671, 672, 673, 674; 403/154, 157, 315, 316, 317

[56] References Cited
U.S. PATENT DOCUMENTS

| 3,782,571 | 1/1974 | Murphy et al. | 214/674 |
| 3,915,324 | 10/1975 | Green et al. | 214/674 |

*Primary Examiner*—Robert W. Saifer
*Assistant Examiner*—Jeffrey V. Nase
*Attorney, Agent, or Firm*—Phillips, Moore, Weissenberger, Lempio & Majestic

[57] ABSTRACT

An adjustable lock arrangement for a lift truck mast hanger pin to retain it within an upwardly opening slot, such as formed by a J-hook member provided on the front of a lift truck frame, comprises a bore provided in the J-hook member above the slot and a vertical locking plate having a pilot pin provided intermediate upper and lower portions and adapted to fit rotatably within the bore, an arcuate surface on the lower portion adapted to engage a mast pin disposed within the slot and having a center adjacent the pilot pin axis, an arcuate slot provided in the upper portion having a center at the center axis of the pilot pin, and a bolt disposed in the arcuate slot and threaded into the J-hook member for securing of the locking plate against rotation.

7 Claims, 4 Drawing Figures

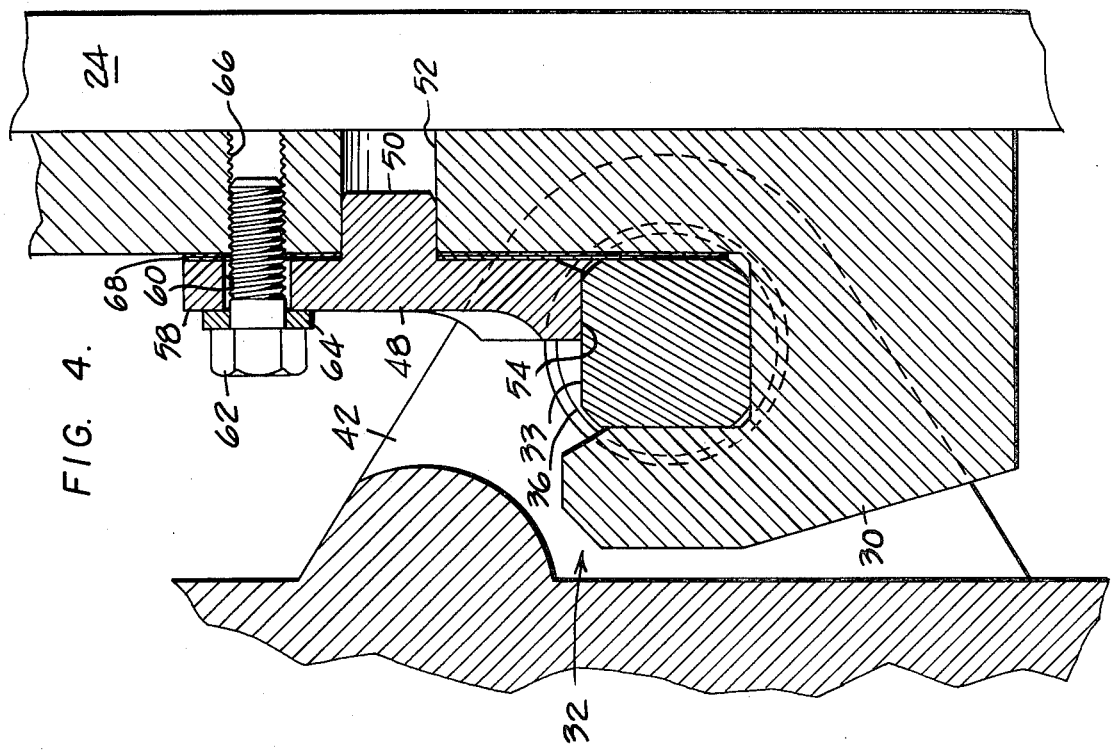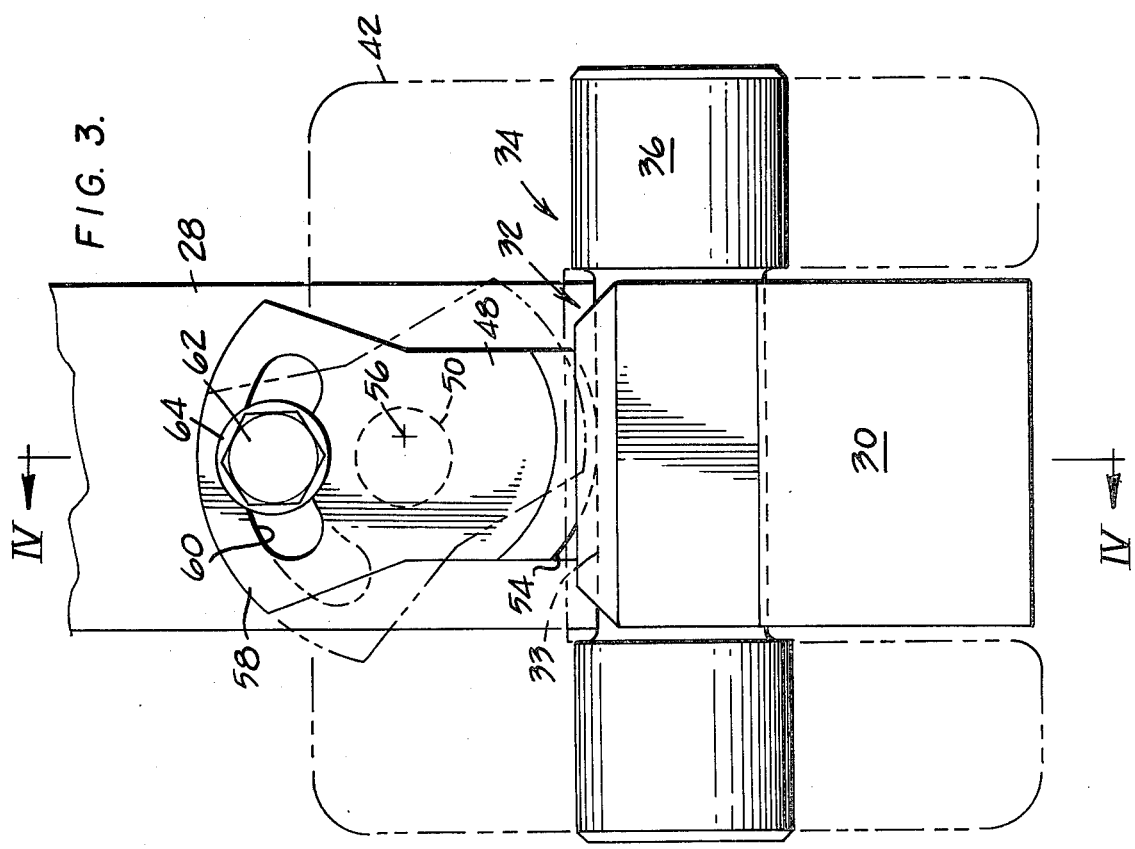

ADJUSTABLE LOCK FOR MAST HANGER

BACKGROUND OF THE INVENTION

This invention relates to the field of lift trucks, and more particularly to means for securing a lift mast assembly to the front of a lift truck frame. Prior art arrangements have provided pairs of spaced parallel bracket members secured to the rear of the mast uprights and having axially aligned bores therein which rotatably receive support shafts therein which have a rectangular cross sectional central portion disposed between the brackets.

The rectangular central portions of the support shafts are cradled in upwardly opening slots formed by J-hook members provided on the front of the lift truck frame. In the past, the support shafts have been retained within the slots by retainer plates that are bolted to the J-hook members immediately above the central portions of the pivot pins disposed in the slots. The retainer plates have lower edges that bear against the support shafts and retain them securely in the J-hook slots.

The mast asembly may be removed from the lift truck by removing the bolts securing the retainer plates to the J-hooks, removing the retainer plates, and lifting the mast assembly until the support shafts clear the front of the slots.

The foregoing arrangement has many attractive features and advantages. However, one problem that has been encountered is that it requires close tolerances to insure that the bottom edges of the retainer plates will bear firmly against the central portions of the support shafts when the retainer plates are secured for the J-hooks by the securing bolts which pass through suitable bores in the retainer plates and threadably engage the J-hook members in threaded bores provided therein.

Another problem encountered has been shearing of the the retaining bolts when sudden up-loads on the mast assembly are encountered, such as when the left truck runs the mast assembly, or the forks mounted thereon, into the ground, or another object.

SUMMARY OF THE INVENTION

The present invention is directed to overcoming the foregoing problems. Accordingly, the present invention provides a means for locking a mast hanger pivot pin into a J-hook slot firmly and securely without any "play," but which does not require special machining or close tolerances in its construction.

The present invention also provides such an arrangement which also is capable of sustaining large shear forces that might be imposed by unexpected uploading of the mast assembly.

These and other advantages are achieved by the present invention which provides a J-hook hanger for a mast assembly having a first bore in the hanger above the J-hook, and a second, threaded bore in the hanger above the first bore.

A cam lock plate is provided above the J-hook slot for locking the support shaft therein. The cam lock plate includes a central portion having a pilot pin which is rotatably mounted in the first bore. A portion of the cam plate depends from the central portion and terminates in an arcuate cam surface having a center eccentric from the axis of the pilot pin. A portion of the cam plate extends above the pilot pin and has an arcuate slot provided therein which has a center on the axis of the pilot pin. A bolt disposed in the slot is threadably disposed in the threaded bore for rotatably locking the cam plate cam surface against the mast support shaft.

DESCRIPTION OF THE DRAWINGS

FIG. 3 is a first view of the adjustable lock of the present invention; and

FIG. 4 is a sectional view thereof.

DESCRIPTION OF THE PREFERRED EMBODIMENT

Figure 1:
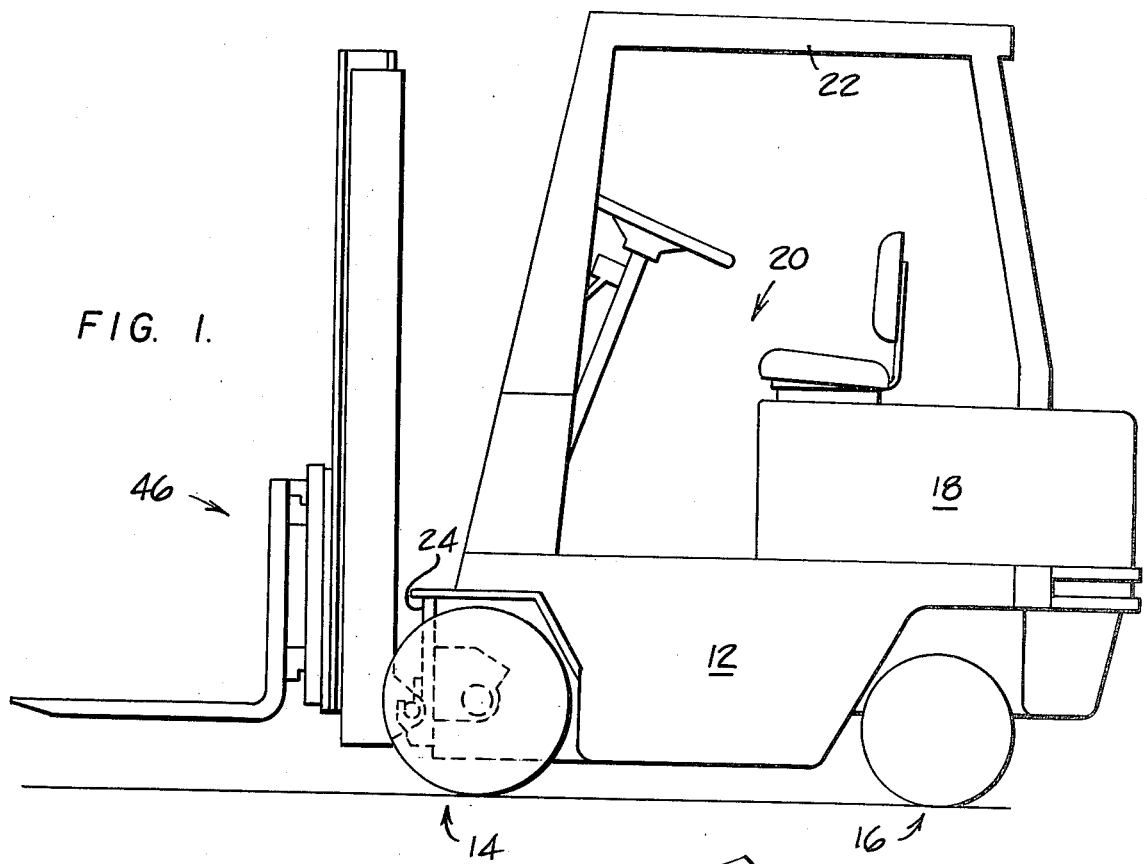
FIG. 1 is an elevational view of a lift truck embodying the present invention.

Referring to FIG. 1, a lift truck embodying the present invention comprises a frame 12 mounted on front and rear axle assemblies 14 and 16, and has an engine compartment 18 and an operator's station 20 mounted thereon enclosed by a roll over protective structure 22.

Figure 2:
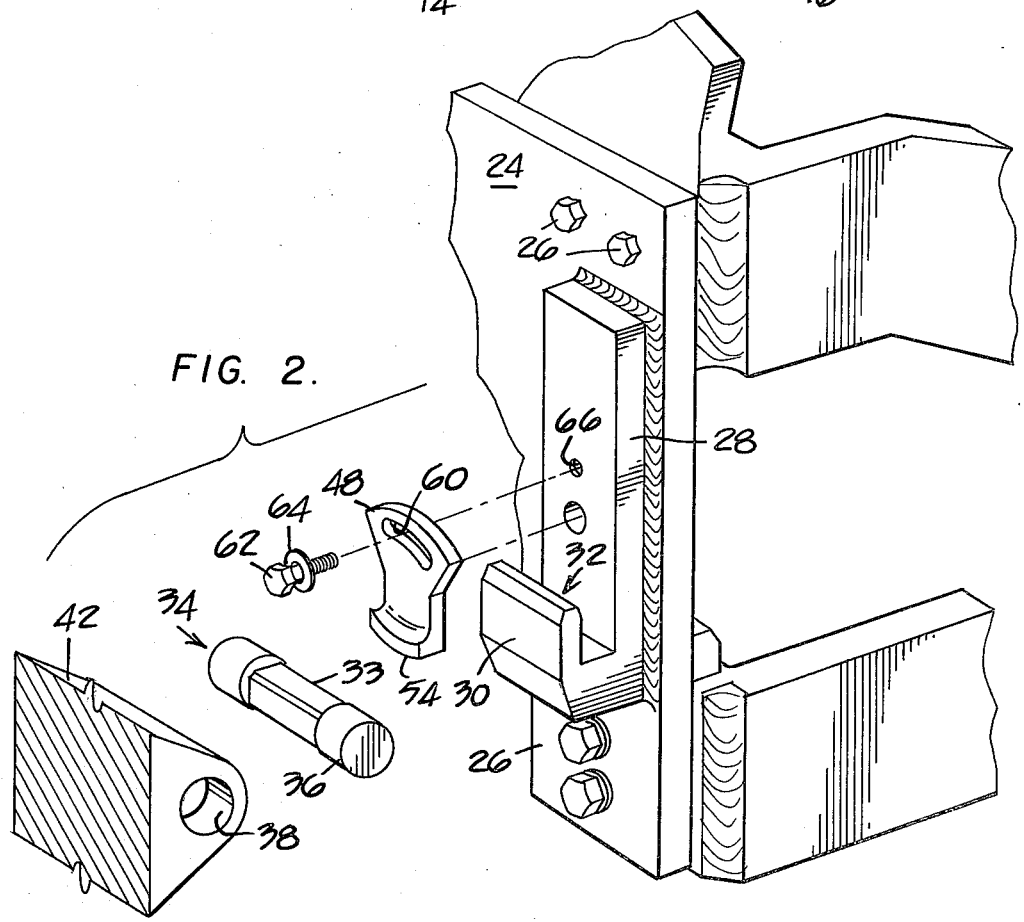
FIG. 2 is an exploded view of the mast hanger and adjustable lock of the present invention.

A mounting plate 24 is removably secured to the front of frame 12 by means of bolts 26 and has hanger brackets 28 mounted thereon, one of which is shown in FIG. 2. The lower end of the hanger bracket terminates in a J-hook 30 which forms an upward opening slot 32, and forms support means for receiving the square center portion 33 of a mast support shaft 34 which has cylindrical ends 36 mounted in axially aligned bores 38 provided in mounting brackets 42 mounted on the back of a lift mast assembly 46. Although the device of the present invention is shown and decribed herein employed in connection with a J-hook, it is equally useful with any other means forming a slot to retain a support shaft therein.

A cam locking plate 48 has a pilot pin 50 which projects rearwardly of the central portion thereof and is rotatably disposed in a first bore 52 provided in hanger bracket 28 above slot 32. A portion of locking plate 48 depends below pilot pin 50 and terminates in an arcuate cam surface 54 adopted to bear against the central portion 33 of support shaft 34 disposed in slot 32. The arcuate cam surface is arcuate about a center 56 which is laterally offset from the axis of pilot pin 50. Thus, as the locking plate is rotated about the pilot pin whereby center 56 is rotated downward from the axis of the pilot pin, the point on cam surface 54 directly above support shaft 34 will be extended downward until it engages support shaft 34.

Another portion 58 of the cam locking plate extends above the pilot pin and has an arcuate slot 60 provided therein having a center on the axis of pilot pin 50. A bolt 62 having a washer 64 passes through slot 60 and is threadably disposed in a second bore 66 in hanger bracket 28 for securing the cam locking plate against rotation about pivot pin 50 after cam surface 54 has firmly engaged support shaft 34.

Shims 68 may be disposed intermediate the hanger bracket 28 and the support shaft 34 and locking plate 48 to compensate for irregular tolerances in the shaft 34 and prevent foreandaft motion of the support shaft 34 in the slot 32.

It will be appreciated that such engagement of the support shaft by the locking plate can be readily achieved by rotation of the locking plate on pin 50 until the cam surface engages the support shaft and clamps it firmly in slot 32. Thus, close tolerances in the elements of the hanger assembly of the present invention, including the J-hooks, support shafts, locking plates or hanger bracket bores are unnecessary for secure retention of the support shafts in the J-hook slots.

Pilot pin 50 not only provides retention and rotation means for the cam locking plate, but also serves to bear any uploading of the mast and support shafts, preventing shear stress in bolt 62.

The embodiments of the invention in which an exclusive property or privilege is claimed are defined as follows:

1. In a lift truck mast mounting assembly including a frame, a mast assembly, and at least one support shaft, means mounting the support shaft on the back of the mast assembly, a hanger bracket mounted on the frame and including support means for supporting the support shaft; lock means for retaining the support shafts in said support means comprising first bores provided in the hanger bracket spaced from the support means, cam locking plates having pilot pins extending therefrom rotatably mounted in said first bores, cam surfaces provided on a portion of the cam locking plates and arranged to engage a support shaft disposed in the support means, an arcuate slot provided in the cam locking plate, and a bolt means disposed in the arcuate slot and threadably secured in a second bore located in the hanger bracket.

2. The invention of claim 1 wherein said cam surface is arcuate and has a center eccentric from the axis of the pilot pin.

3. The invention of claim 2 wherein the cam locking plate includes a first portion depending from said pilot pin and terminating in said cam surface, a second portion upstanding from said pilot pin opposite from said first portion and having said arcuate slot provided therein, the center of said slot being on the axis of the pilot pin.

4. An adjustable lock for a mast hanger of a lift truck which includes a hook member supported on the truck frame and a shaft member mounted on a mast assembly and supported on said hook member comprising, a cam member, means for rotatably mounting said cam member on the hook member, said cam member being arranged to engage said shaft member upon rotation thereof on the hook member and securing means for securing the cam member against rotation, whereby it can be locked against the shaft member.

5. The invention of claim 4 wherein the securing means comprises arcuate slot means formed in one of said cam and hook members, and bolt means disposed in said slot means and threadably secured in the other of said cam and hook members.

6. The invention of claim 4 wherein said means for rotatably mounting said cam member includes a pilot pin provided or said cam member and rotatably mounted in a bore provided in said hook member, and said cam member includes an arcuate cam surface having a center eccentric from the axis of said pilot pin.

7. The invention of claim 6 wherein said cam member includes a depending portion which extends below said pilot pin and has said cam surface thereon, and an upstanding portion which extends above said pilot pin opposite from said depending portion and wherein said securing means comprises an arcute slot provided in said upstanding portion having a center on the axis of the pilot pin.

* * * * *

UNITED STATES PATENT OFFICE
CERTIFICATE OF CORRECTION

Patent No. 4,126,208                    Dated   November 21, 1978

Inventor(s) MILFORD D. McVEEN

It is certified that error appears in the above-identified patent and that said Letters Patent are hereby corrected as shown below:

Col. 3, Claim 1, line 15:   delete "shafts" and replace with --shaft--;

Col. 3, Claim 1, line 16:   insert the word --a-- before the word "first";

delete the word "bores" and replace with the word --bore--;

Col. 3, Claim 1, line 17:   insert the word --a-- before the word "cam";

Col. 3, Claim 1, line 18:   delete the word "plates" and replace with --plate--;

delete the word "pins" and replace with --pin--;

insert the word --a-- before the word "pilot";

UNITED STATES PATENT OFFICE
CERTIFICATE OF CORRECTION

Patent No. 4,126,208　　　　　　　　Dated November 21, 1978

Inventor(s) MILFORD D. McVEEN

It is certified that error appears in the above-identified patent and that said Letters Patent are hereby corrected as shown below:

| | |
|---|---|
| Col. 3, Claim 1, line 19: | insert the word --a-- before the word "cam"; |
| | delete the word "surfaces" and replace with --surface--; |
| | delete the word "bores" and replace with --bore--; |
| Col. 3, Claim 1, line 20: | delete the word "plates" and replace with --plate--; |
| Col. 3, Claim 1, line 21: | delete the word "a" and replace with --said--. |

Signed and Sealed this

Twenty-third Day of October 1979

[SEAL]

Attest:

RUTH C. MASON
Attesting Officer

LUTRELLE F. PARKER
Acting Commissioner of Patents and Trademarks